United States Patent
Merino Lopez et al.

(10) Patent No.: US 11,505,002 B2
(45) Date of Patent: Nov. 22, 2022

(54) NON-PNEUMATIC WHEEL COMPRISING A CIRCUMFERENTIAL REINFORCEMENT STRUCTURE

(71) Applicant: COMPAGNIE GENERALE DES ETABLISSEMENTS MICHELIN, Clermont-Ferrand (FR)

(72) Inventors: Jose Merino Lopez, Clermont-Ferrand (FR); Gael Pataut, Clermont-Ferrand (FR); Sebastien Rigo, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 391 days.

(21) Appl. No.: 16/625,230

(22) PCT Filed: Jun. 19, 2018

(86) PCT No.: PCT/IB2018/054503
§ 371 (c)(1),
(2) Date: Dec. 20, 2019

(87) PCT Pub. No.: WO2018/234989
PCT Pub. Date: Dec. 27, 2018

(65) Prior Publication Data
US 2020/0139764 A1 May 7, 2020

(30) Foreign Application Priority Data

Jun. 20, 2017 (FR) ........................... 1770651
Dec. 15, 2017 (FR) ........................... 1762213

(51) Int. Cl.
*B60C 7/18* (2006.01)
*B60B 1/06* (2006.01)
*B60B 5/02* (2006.01)

(52) U.S. Cl.
CPC ................ *B60C 7/18* (2013.01); *B60B 1/06* (2013.01); *B60B 5/02* (2013.01); *B60B 2360/341* (2013.01); *B60B 2900/711* (2013.01)

(58) Field of Classification Search
CPC .. B60C 7/18; B60C 7/102; B60B 1/06; B60B 5/02; B60B 2360/341; B60B 2900/711
See application file for complete search history.

(56) References Cited

U.S. PATENT DOCUMENTS

| | | | | |
|---|---|---|---|---|
| 1,349,914 A | * | 8/1920 | Pratt | ................. B29D 30/02 156/112 |
| 3,730,244 A | | 5/1973 | Ross | |

(Continued)

FOREIGN PATENT DOCUMENTS

| | | |
|---|---|---|
| EP | 0 853 009 A2 | 7/1998 |
| WO | 2008/118983 A1 | 10/2008 |

(Continued)

OTHER PUBLICATIONS

International Search Report dated Sep. 14, 2018, in corresponding PCT/IB2018/054503 (6 pages).

*Primary Examiner* — Scott A Browne
(74) *Attorney, Agent, or Firm* — Venable LLP

(57) ABSTRACT

A non-pneumatic wheel (1) comprises a crown reinforcing region (10) itself radially on the inside of a tread (7), the crown reinforcing region (10) comprising a plurality of reinforcing strips (12, 14) arranged in at least three layers of strips (12, 14) arranged in such a way that a virtual axis C-C substantially perpendicular to the strips intersects at least two strips in any axial position of the virtual axis in the crown reinforcing region.

12 Claims, 3 Drawing Sheets

(56) References Cited

U.S. PATENT DOCUMENTS

| | | | |
|---|---|---|---|
| 5,879,484 A | 3/1999 | Spragg et al. | |
| 6,405,773 B1 | 6/2002 | Vossberg et al. | |
| 6,769,465 B2 | 8/2004 | Rhyne et al. | |
| 6,994,134 B2 | 2/2006 | Grah | |
| 7,013,939 B2 | 3/2006 | Rhyne et al. | |
| 7,201,194 B2 | 4/2007 | Rhyne et al. | |
| 10,105,989 B2 | 10/2018 | Cron et al. | |
| 2007/0267116 A1* | 11/2007 | Rhyne | B60C 7/20 |
| | | | 152/246 |
| 2012/0318417 A1* | 12/2012 | Dotson | B60C 9/1807 |
| | | | 152/17 |
| 2014/0326374 A1 | 11/2014 | Cron et al. | |
| 2019/0054767 A1 | 2/2019 | Cron et al. | |
| 2021/0070106 A1* | 3/2021 | Merino Lopez | B60C 7/18 |

FOREIGN PATENT DOCUMENTS

| WO | 2013/095499 A1 | 6/2013 |
|---|---|---|
| WO | 2016/198171 A1 | 12/2016 |

\* cited by examiner

NON-PNEUMATIC WHEEL COMPRISING A CIRCUMFERENTIAL REINFORCEMENT STRUCTURE

TECHNICAL FIELD OF THE INVENTION

The present invention relates to reinforcing elements for a non-pneumatic wheel. It relates more particularly to architectural elements for the crown of this wheel.

PRIOR ART

A conventional pneumatic tyre, normal operation of which requires it to be inflated, is a well-known solution able to meet strict requirements in terms of comfort, mass, rolling resistance, etc. This type of tyre does, however, have a number of disadvantages associated with its structure, such as the complexity, the need for maintenance, and the risks of damage, particularly of puncturing. In order to alleviate some of these disadvantages, non-pneumatic wheels were developed already several years ago. Examples of non-pneumatic wheels are disclosed in the following documents: U.S. Pat. Nos. 6,769,465, 6,994,134 and 7,013,939 for example. Certain non-pneumatic wheels comprise a peripheral ring, referred to more commonly as a "shear band", as for example in U.S. Pat. No. 7,201,194. Such architectures make it possible to obtain certain aspects of performance without the need to be subject to the constraints inherent in inflating found with conventional tyres.

For example, document U.S. Pat. No. 6,769,465 relates to a tyre of the resilient type supporting a load without internal pressure. It comprises a portion for contact with the ground, side walls extending from the contact portion towards beads suited to holding the tyre on a wheel. A reinforced annular band is provided on the inside of the tread. This band comprises at least a uniform layer and two membranes, namely one on each side of the uniform layer. Each membrane has an extension modulus higher than the dynamic modulus of the uniform layer, so that when the wheel is supporting a load, the portion that is in contact with the ground deforms in order to produce a contact patch in contact with the ground. Such an architecture involves a relative displacement of the various layers as they flatten. This construction is also complex and relatively expensive to produce.

There is therefore still a need for a wheel of non-pneumatic type that makes it possible to obtain satisfactory performance, with an architecture that is simpler, and offers improved durability. There is also still a need for a non-pneumatic wheel that exhibits improved rolling resistance characteristics.

The invention provides various technical means for overcoming these various drawbacks, notably the complexity of production and the fragility of certain regions of the crown.

SUMMARY OF THE INVENTION

First of all, a first objective of the invention is to provide a non-pneumatic wheel that offers improved performance.

Another objective of the invention consists in providing an arrangement of crown reinforcing elements that are able to be shaped in a wide range of variants, thereby making it possible to adapt the characteristics of the crown according to the type of tyre.

Another objective of the invention consists in simplifying the architecture and the manufacturing process, in particular in the region of the crown.

In order to do this, the invention provides a non-pneumatic wheel comprising an annular reinforcing structure produced from at least one elastomer compound, arranged radially on the inside of a tread, the said annular reinforcing structure comprising a plurality of reinforcing strips arranged in layers, the said strips of each of the layers being arranged in an axial juxtaposition and being oriented in a substantially circumferential direction, the reinforcing strips being made of a thermoplastic film having a modulus higher than 0.9 GPa and preferably higher than 2 GPa in the main direction and in the transverse direction, the said strips being coated with an elastomer composition, the annular reinforcing structure comprising N radially superposed layers of strips, N being greater than or equal to three, a virtual axis C-C substantially perpendicular to the strips intersecting at least N−1 strips in any axial position of the said virtual axis in the crown reinforcing region.

Such an architecture makes it possible to simplify the crown region, to obtain a highly compact reinforcing region while providing significant reductions in weight. The number of radially superposed layers and the respective arrangement thereof makes it possible to optimize the endurance of the crown region. The method of manufacture is simple to implement. Finally, this architecture makes it possible to reduce the rolling resistance on account of the simplified, optimized and thinner arrangement.

According to one advantageous embodiment, the annular reinforcing structure comprises N radially superposed layers, N being greater than three, a virtual axis C-C substantially perpendicular to the strips intersects at least N−1 strips in any axial position of the said virtual axis in the annular reinforcing structure. For example, with four radially superposed layers of strips, any perpendicular axis passes through at least three strips. This embodiment provides a crown region that is particularly uniform, thereby making it possible to obtain advantageous dynamic qualities such as, for example, excellent material strength, even under harsh driving conditions, particularly under cornering. With four layers of strips, the strips of each layer of superposed strips radially overlap the strips of the layer of strips that is radially on the inside of it to an extent of at least 20% and at most 80%.

According to another advantageous embodiment, the annular reinforcing structure comprises N radially superposed layers, N being greater than three, a virtual axis C-C substantially perpendicular to the strips intersecting a number greater than N/2 of strips in any axial position of the said virtual axis in the annular reinforcing structure.

Advantageously, the mean overlap between the strips of the two radially superposed adjacent layers is greater than 20% and preferably is greater than 40%. Advantageously, the reinforcing strips are made of a thermoplastic film having a modulus higher than 0.9 GPa and preferably higher than 2 GPa, and more advantageously greater than 6 GPa in the main direction and in the transverse direction.

According to one advantageous embodiment, the mean overlap between the strips of two radially superposed adjacent layers is less than 90%.

According to one advantageous embodiment, the length/width and width/thickness aspect ratio of the thermoplastic film is greater than or equal to 5.

According to one advantageous embodiment, the thermoplastic film is made of thermally stabilized biaxially or monoaxially stretched polyester or of polyamide.

According to another advantageous embodiment, the strips are integrated in a matrix made of an elastomeric compound, preferably a diene elastomeric compound. As a preference, the said matrix has a rubber composition which, when cross-linked, has a secant tensile modulus at 10% elongation greater than or equal to 10 MPa, the reinforcing strips being made of a laminate of at least 3 composite layers, each composite layer comprising mutually-parallel oriented high-modulus fibres making an angle α with the circumferential direction, coated in a polymer matrix.

In one exemplary embodiment, the elastomeric compound of the matrix has a modulus at 10% elongation of between 3 and 20 MPa.

In another exemplary embodiment, the elastomeric compound of the matrix has a modulus at 10% elongation of greater than 20 MPa.

According to another advantageous embodiment, the matrix of elastomeric compound comprises circumferential filamentary reinforcing elements integrated in the said matrix.

As an alternative, the strips comprise circumferential filamentary reinforcing elements integrated in the thermoplastic film of which the strips are made.

According to yet another embodiment alternative, the strips are of the composite type and comprise a thermoplastic film and an alignment of reinforcing threads arranged in the vicinity of the thermoplastic film, the whole being integrated in a matrix of elastomeric compound, preferably diene elastomeric compound.

Advantageously, a tread is positioned radially on the outside of the annular reinforcing structure.

Advantageously also, the wheel also comprises a plurality of struts arranged radially on the inside of the annular reinforcing structure, the said struts being configured to transmit tension when load is applied to the wheel.

According to one advantageous embodiment, the wheel moreover comprises a hub, and the struts extend radially between the said hub and the annular reinforcing structure.

According to another advantageous embodiment, the annular reinforcing structure and the tread are formed jointly.

Advantageously, the struts and the annular reinforcing structure are formed jointly.

Advantageously, the interface between the strips and the matrix elastomeric compound involves an adhesive element.

The strips are disposed side by side to form an alignment. The non-pneumatic wheel according to the invention advantageously comprises at least three alignments of strips.

DESCRIPTION OF THE FIGURES

All the embodiment details are given in the description which follows, which is supplemented by FIGS. 1 to 11, which are given solely by way of non-limiting examples and in which.

DETAILED DESCRIPTION OF THE INVENTION

In the present document, the expression "overlap of strips", or overlapping, means an arrangement in which the strips of a radially outer layer overlap the strips of the radially inner layer, that is to say that the projection in the radial direction of one strip onto the strip at a lower level is not zero. The percentage of overlap may vary according to the embodiment. This overlap forms a linkage between the layers, creating cohesion of the whole of the crown reinforcing region. This linkage in particular allows transmission of shear forces between the layers.

A "longitudinal direction" or "circumferential direction" means a direction which corresponds to the periphery of the tyre and which is defined by the direction in which the tyre rolls.

An "axial direction" means a direction parallel to the axis of rolling of the tyre.

A "tread" means a quantity of elastomeric compound delimited by lateral surfaces and by two main surfaces, one of which is intended to come into contact with a road surface when the wheel turns.

The nominal secant moduli (or apparent stress, in MPa) are measured in second elongation (i.e. after an accommodation cycle at the extension rate provided for the measurement itself) at 10% elongation (denoted MA 10) and at 100% elongation (denoted MA 100) at 23° C.±2° C., and under normal hygrometry conditions.

Figure 1:
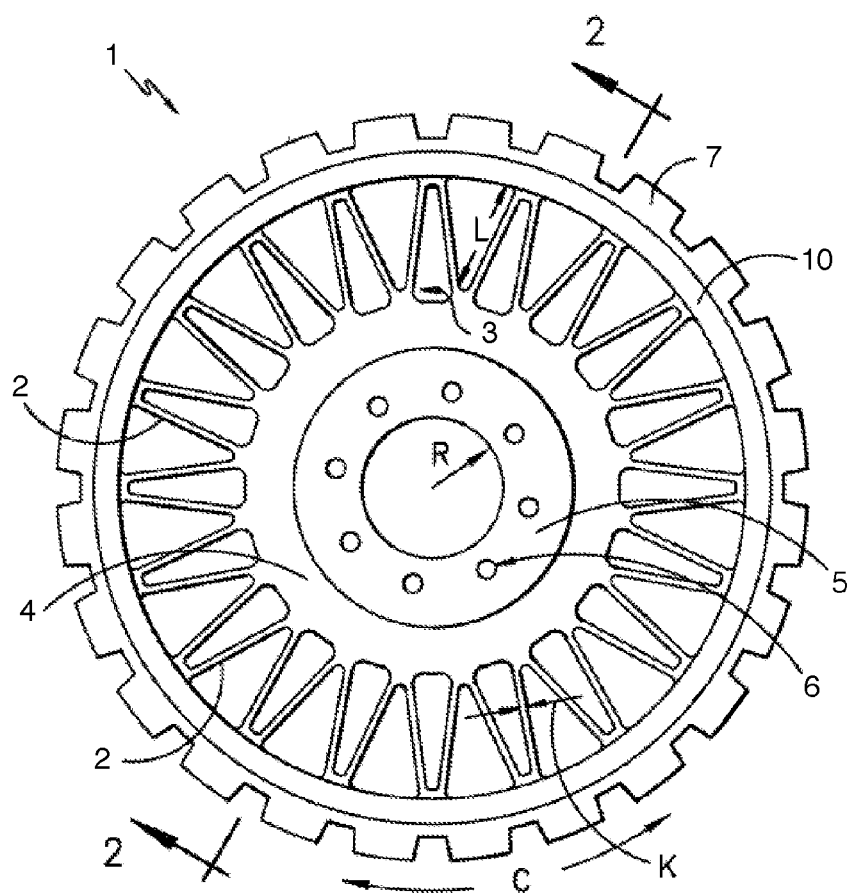
FIG. 1 is a schematic depiction of a non-pneumatic wheel.
Figure 2:
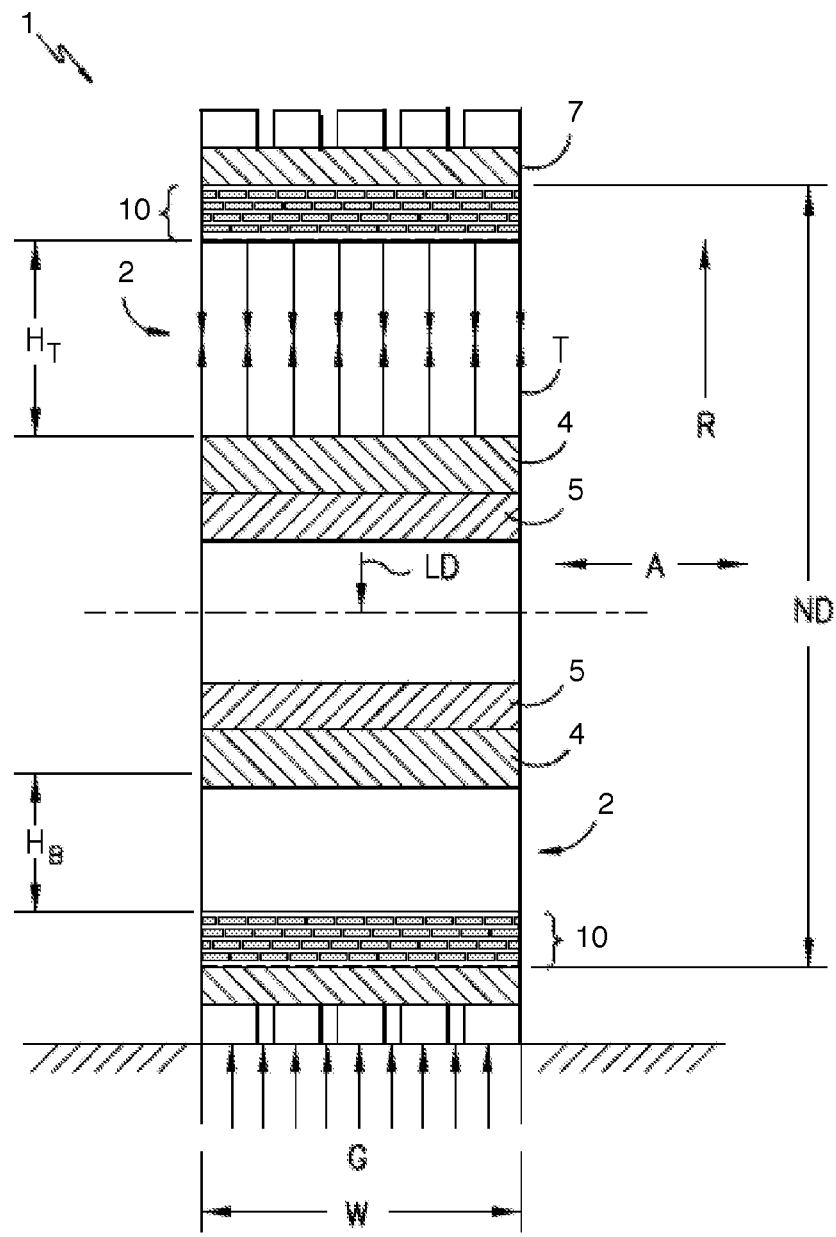
FIG. 2 is a view in cross section of the wheel of FIG. 1.

FIG. 1 is an example of a non-pneumatic wheel 1 liable to comprise an annular reinforcing structure 10 according to the invention. FIG. 2 illustrates the same wheel in transverse cross section on 2-2 of FIG. 1. The wheel, as illustrated in FIGS. 1 and 2, comprises a plurality of struts 2 (or spokes), and an annular reinforcing structure 10. The struts 2 extend in a radial direction, from the centre towards the outside of the wheel, as far as the annular reinforcing structure 10.

The width of the struts is dependent on the embodiment. It may for example correspond to the width W of the wheel, or be less than this. The shape of the struts may also vary according to the embodiment.

The struts 2 are connected to a central mounting ring 4 at the radially inner portion 3 of the spokes 2. This central mounting ring 4 provides attachment of the wheel to a hub 5. Mounting holes 6 provided in the hub 5 allow the wheel to be mounted on and attached to an axle of a vehicle. The wheel 1 may be mounted on a hub already provided, or else may be manufactured as an integral part of the hub 5. In one implementation embodiment, the wheel is manufactured with the struts 2, the central mounting ring 4 and the hub 5 are moulded together.

A tread 7, preferably made of elastomeric compound, is provided at the periphery of the annular reinforcing structure 10. The tread makes it possible to provide the optimal characteristics for running, traction, braking and handling of the wheel. In the examples illustrated, the tread is provided in the form of an annular peripheral layer fixed against the annular reinforcing structure 10. As an alternative, the tread can consist of the radially outer part of the annular reinforcing structure 10. The tread comprises, in the conventional way, tread-pattern elements, grooves, sipes, etc.

The struts 2 may be aligned in the radial direction and virtually intersect the axis of rotation, or else may be arranged in a direction that is oblique to the radial direction, as illustrated for example in FIG. 1. Various examples of struts are disclosed for example in U.S. Pat. No. 7,013,939 or else in WO2008/118983. The wheel may thus exhibit various types of strut, such as those illustrated in those documents, or others.

The annular reinforcing structure 10 supports the load LD on the wheel. It is resiliently deformable, particularly so as to create a contact patch for contact with the road or other surface being driven on. As described in document U.S. Pat. No. 7,013,939, when a load LD is applied to the wheel via the hub 5, the annular reinforcing structure 10 deforms locally at the contact patch (arrows G in FIG. 2), while the portion of the wheel that is not in contact with the ground behaves in a similar way to an arch, supporting the load.

The load on the wheel also passes through the struts 2. The struts collaborating with the contact patch region in which the tyre is in contact with the ground do not support tensile forces and may even, in certain cases, buckle, so that the length Ht of the struts in the region under tension is greater than the length Hb of the struts in the region under compression. As the wheel progressively turns, the portion of wheel that acts like an arch is constantly changing. The level of flexing of the annular reinforcing structure 10 and, as a result, the surface area of the contact patch in contact with the ground, is proportional to the load. The characteristics of elastic deformability of the annular reinforcing structure 10, under the action of load, make it possible to provide a contact patch in which the tyre is in contact with the ground but is similar to that of conventional tyres, affording comparable functional benefits.

The struts are advantageously produced in the form of a sheet of length L generally in the radial direction R, and of width W, in an axial direction A, generally corresponding to the axial width of the annular reinforcing structure 10. Other widths are also possible, including widths that vary along the radial direction R. The struts also have a thickness K, generally less than the length L or than the width W. This thickness is tailored to the need for the struts to buckle in the contact patch in which the tyre is in contact with the ground. A smaller thickness allows buckling or flexing at lower levels of loading. As previously described, the main force involved in the transmission of load is in the tensile force illustrated by the arrows T in FIG. 2.

The tensile force in the struts is distributed along the annular reinforcing structure 10. According to one exemplary embodiment, the struts are made of an elastomeric compound having a tensile modulus (Young's modulus) of around 3 MPa to 1.2 GPa. The struts may be reinforced, if need be.

According to another exemplary embodiment, the struts 2 are fixed to the hub 5 for example by providing widened portions at the radially inner ends, to engage in slots made at the hub.

The struts may potentially be curved in order to encourage them to begin to flex. The struts are preferably designed to withstand the torsion loadings and/or lateral loadings caused for example by cornering.

FIGS. 3 to 10 illustrate exemplary embodiments of the annular reinforcing structure 10.

Figure 3:
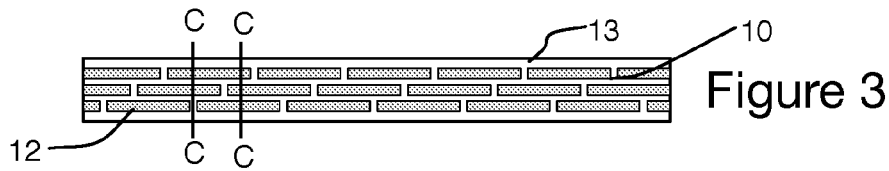
FIG. 3 is a schematic depiction of an example of a reinforcing structure according to the invention, comprising three alignments of strips.

FIG. 3 illustrates a first embodiment of an annular reinforcing structure 10 according to the invention. According to this embodiment, strips 12 made of a thermoplastic film are disposed side by side at an angle substantially in the region of 0 degrees, and more broadly at an angle less than substantially 12 degrees to the circumferential direction. The whole is embedded in a matrix 13 made up of an elastomeric compound, preferably a diene elastomeric compound. The staggered arrangement of the strips is realized for example by first winding-off starting at a given azimuth, and second winding-off starting at 180 degrees. As an alternative, the strips are positioned by first winding-off in one given axial direction, followed by second winding-off in the opposite axial direction.

The strips of a layer are separated by a region of rubber (or the elastomeric compound) referred to hereinafter as rubber bridge.

In the exemplary embodiment of FIG. 3, the crown 10 comprises three layers of strips 12 which are slightly offset axially so that the separation between the layers forms a staircase layout.

Figure 4:
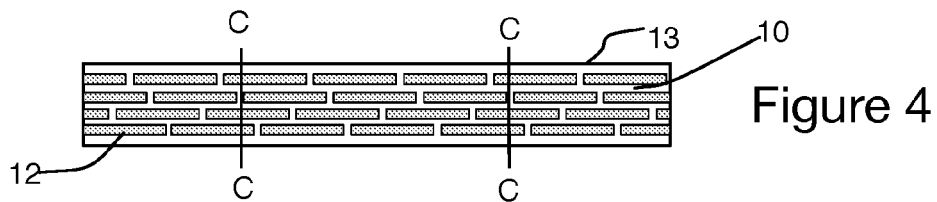
FIGS. 4 and 5 are schematic depictions of other examples of a reinforcing structure according to the invention, comprising four alignments of strips.

The exemplary embodiment of FIG. 4 comprises four rows of strips 12 which are axially offset in a way comparable to the example of FIG. 3, the offset forming a staircase-tread arrangement.

In the examples of FIGS. 3 and 4, the lateral offset between the positions of the strips of the two layers is less than half the pitch of the strip.

Figure 5:
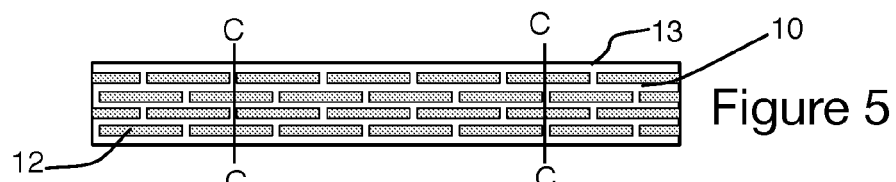

FIG. 5 illustrates another exemplary embodiment in which the annular reinforcing structure 10 comprises four layers of strips 12. The lateral offset between the positions of the strips of two successive layers is around half the pitch of the strip. The bridges of elastomeric compound between the strips of the first layer are thus positioned substantially at the middle of the respective widths of the strips of the adjacent layer.

In all the examples presented, the main plane of each layer is substantially axial. Such an arrangement has the effect of covering the bridges of elastomeric compound of the first layer with the strips that make up the second layer, and so on, from the first layer to the last, whatever the number of layers.

In the various examples shown, the layers of strips are arranged in such a way that there is no superposition of rubber bridges along any line or virtual axis C-C substantially perpendicular to the strips. This concept may be applied for three, four or more layers of strips. Preferentially, the following arrangements are implemented:

for three layers, the virtual axis C-C intersects at least two layers;

for four layers, the virtual axis C-C intersects at least three layers;

for five layers, the virtual axis C-C intersects at least three layers, and preferably four layers;

for six layers, the virtual axis C-C intersects at least four layers, and preferably five layers;

for seven layers, the virtual axis C-C intersects at least four layers, and preferably five layers, and more preferably still six layers.

Thus, the number of layers through which a virtual axis C-C passes is greater than N/2, N being the number of layers of strips.

Figure 6:
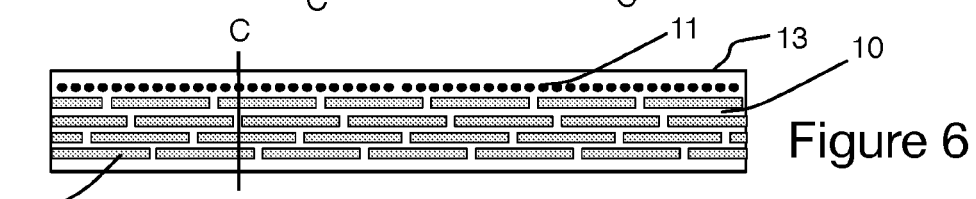
FIGS. 6 and 7 are schematic depictions of other examples of a reinforcing structure, comprising an alignment of reinforcing cords in addition to the layers of strips such as those of FIG. 5.
Figure 7:
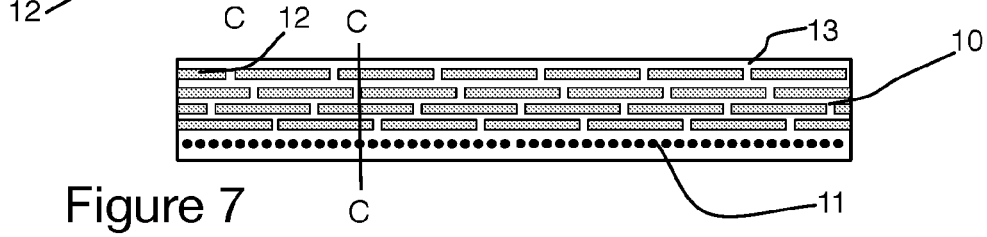

FIGS. 6 and 7 show exemplary embodiments similar to that of FIG. 4, additionally comprising a layer of circumferential filamentary reinforcing elements 11. In the example of FIG. 6, the layer of reinforcing elements is provided radially on the outside of the strips. In the example of FIG. 7, the layer of reinforcing elements is provided radially on the inside of the strips. The threads 11 are preferably textile threads. In addition to providing a certain stiffness, the circumferential threads make it possible to protect the radially inner layers. Another alternative form, not illustrated, provides two layers of circumferential reinforcing elements 11, one radially on the inside of the strips and the other radially on the outside of the strips. The circumferential threads may even be arranged between one or more layers of strips.

Figure 8A:
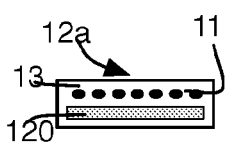
FIG. 8A is a schematic depiction of an example of a composite strip according to the invention, made up of textile reinforcing cords, thermoplastic strips and a diene matrix.
Figure 8B:
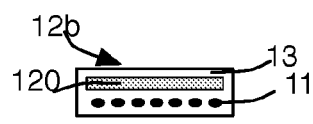
FIG. 8B is a schematic depiction of an alternative form of composite strip, in which the arrangement of the textile cords and of the thermoplastic strips is reversed.
Figure 9:
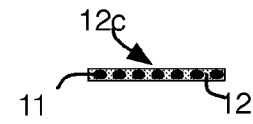
FIG. 9 is a schematic depiction of a two-element composite strip in which the textile reinforcing cords are integrated in a thermoplastic strip.

A second embodiment of the strips is presented with reference to FIGS. 8A, 8B and 9. FIG. 8A illustrates an exemplary embodiment in which a thermoplastic film 120 as described hereinabove is surmounted by a layer 11 of reinforcing threads, preferably textile. The whole is embedded in a matrix 13 made up of an elastomeric compound, preferably a diene elastomeric compound, and forms a composite strip 12a. FIG. 8B presents an alternative form of composite strip 12b with a reverse geometry, the layer of threads 11 being arranged radially on the inside with respect to the thermoplastic film 120.

FIG. 9 illustrates a third example of composite strip 12c in which a layer of reinforcing threads 11 is integrated directly into a thermoplastic film 120. This alternative form has the additional advantages of greater lightness of weight and very high compactness.

Figure 10:
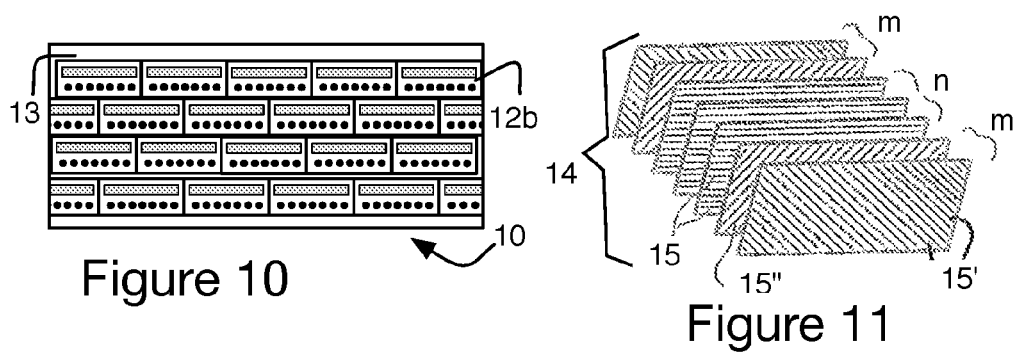
FIG. 10 is a schematic depiction of an example of a reinforcing structure in which composite strips are aligned.

FIG. 10 illustrates one example of a layout comprising four layers of strips, using strips such as those presented with reference to FIG. 8B; as an equivalent, they could be the strips presented in FIG. 8A or 9.

The composite strips make it possible to simplify the steps of manufacturing the crown region of the wheel. By altering only the type of strip, without changing the other architectural elements of the wheel, the composite strips make it possible to vary the characteristics of the crown region to suit the requirements, providing greater design flexibility.

For each of the abovementioned embodiments, different parameters can be altered, such as the relative width of the constituent elements, different widths in different layers, the thicknesses of the components, the number of alignments of strips, which may be higher, in particular for specific wheels such as wheels for industrial vehicles or some other use.

The thermoplastic film of the reinforcing strips 12, 12a, 12b, 12c is advantageously produced with the aid of materials selected from the following: thermally stabilized biaxially or monoaxially stretched polyester, polyamide (for example nylon 6.6). As an alternative, these materials can be filled with isotropic or anisotropic inclusions or inclusions of fibrillar form.

The strips 12, 12a, 12b, 12c have a ratio between the length/width and width/thickness dimensions that is greater than or equal to 5. The thermoplastic film has a modulus in the main direction (corresponding to the circumferential direction of the tyre) and in the transverse direction of greater than 0.9 GPa and preferably greater than 2 GPa.

The matrix 13 or in which the strips 12 or 12a, or 12b, or 12c are integrated is made up of an elastomeric compound, preferably a diene elastomeric compound, having a modulus at 10% elongation that is conventional (typically between 3 and 20 MPa), or preferably stiff (that is to say greater than 20 MPa). A suitable adhesive system according to the nature of the reinforcing elements and the compounds can be used in order to obtain the necessary cohesion. This adhesive system is obtained for example by physical or chemical preparation or activation of the surfaces and then by using an adhesive.

The reinforcing cords 11 are made up of materials selected from the following: aramid, polyester (PET, PEN, PTT), nylon, rayon, polyketone, metal thread or cord, or composite thread or cord (glass or carbon with resin), or a hybrid reinforcing element made up of a combination of the above materials.

A third embodiment of the strips 14 is described hereinbelow and illustrated in FIG. 11. The reinforcing strips 14 are made up of a laminate of at least 3 composite layers, each composite layer comprising mutually-parallel oriented high-modulus fibres (15, 15', 15") making an angle $\alpha$ with the circumferential direction (which is to say the longitudinal direction of the strip), coated in a polymer matrix. As a preference, the angle $\alpha$ formed by the fibres with the circumferential direction ranges from −90° to 90°.

Preferentially, the laminate comprises:
n interior composite layers having fibres 15 of which the angle with the circumferential direction is 0°, n being a number greater than or equal to 1, preferably ranging from 1 to 20, more preferably ranging from 1 to 12, more preferably still from 1 to 6, these interior composite layers being juxtaposed with one another and flanked on each side respectively by m exterior composite layers,
each exterior composite layer having fibres 15', 15" forming an angle $\alpha$ other than 0° with the circumferential direction, m ranging from 1 to 8, the angle $\alpha$ of the fibres 15', 15" of the successive exterior composite layers laid on the one same side of the interior composite layers being identical or different, and the angle $\alpha$ of the fibres 15', 15" of two exterior composite layers laid symmetrically one on each side of the interior composite layers being identical.

The total number of layers in the laminate is therefore n+2m.

Figure 11:
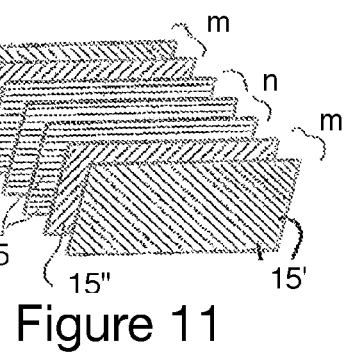
FIG. 11 is a view in cross section of one exemplary embodiment of a strip according to the invention, made up of a laminate of 7 composite layers.

FIG. 11 illustrates a variation of embodiment in which n is equal to 3 and m is equal to 2. According to a preferred variation of embodiment of the invention, n and m are equal to 1. As a greater preference, the angle $\alpha$ of the fibres 15', 15" of the exterior composite layers is equal to 45° or to −45°. According to another preferred embodiment of the invention, n is equal to 1 and m is equal to 2.

As a greater preference, the angle $\alpha$ of the fibres of the two exterior composite layers is equal to 45° or to −45°.

According to another embodiment of the invention, the laminate comprises:
n interior composite layers having fibres 15 of which the angle with the circumferential direction is 0°, n being a number greater than or equal to 3, preferably ranging from 3 to 20, more preferably ranging from 3 to 12, more preferably still from 3 to 6, these interior composite layers being juxtaposed with one another and flanked on each side respectively by m exterior composite layers,
each exterior composite layer having fibres 15', 15" forming an angle $\alpha$ other than 0° with the circumferential direction, m ranging from 1 to 8, the angle $\alpha$ of the fibres 15', 15" of the successive exterior composite layers laid on the one same side of the interior composite layers being identical or different, and the angle α of the fibres 15', 15" of two exterior composite layers laid symmetrically one on each side of the interior composite layers being identical in terms of absolute value, but of opposite sign.

The composite strips may be made from preimpregnated composite layers NTPT ThinPreg 450™ or NTPT ThinPreg 402™ (which can be obtained notably by applying the method described in document WO 2016/198171). The preimpregnated composite layers are laid raw or unpolymerized at the desired lamination angles and form a width the dimension of which is greater than the width of the strips. The laminated width is cut into raw or unpolymerized strips of the desired width. The raw strips are laid by winding (with an axial offset on each turn) on a large-diameter (i.e. 2 metres diameter) drum. The strips are cured under vacuum (−850 mbar) and under pressure (5 bar) using the usual curing peripherals (such as peel ply, bleeder cloth, microperforated or non-perforated release film, vacuum-bagging film, etc.). According to another embodiment, the laminated width is laid on a large-diameter drum and cured under vacuum (−850 mbar) and under pressure (5 bar) using the usual curing peripherals. After curing, the width is cut into strips. As a preference, the strips have a thickness less than or equal to 1 mm, and more preferably less than or equal to 0.7 mm, and more advantageously still less than or equal to 0.5 mm.

Let us now look at the elements that make up the strips 14. The polymer matrix of each composite layer of laminate of a strip comprises a thermosetting polymer or a thermoplastic polymer used respectively by itself or as a blend with other polymers. Preferentially, the polymer matrix may be selected from among the thermosetting resins of the polyepoxide, unsaturated polyester, vinyl ester, ester cyanate, bismaleimide, type, polyurethanes, and a blend of such resins, or else from thermoplastic resins such as polyesters (PET, PBT, PEN, PBN), polyamides (nylon, aramid), polyimides, polyethersulfones, polyphenylenesulfones, polyketones (PK, PEEK). Of the aforementioned resins, those that are particularly suitable are thermosetting resins having a glass transition temperature greater than or equal to 160° C., and thermoplastic resins having a melting point greater than or equal to 180° C. Note that reinforcing fillers (silica, carbon black) or thermoplastic fillers (Orgasol by Arkema) or elastomeric fillers (Kane Ace by Kaneka) may be added to the above resins. Particularly suitable for the invention are composite layers having a surface density of around 200 g/m$^2$ and a pre-curing thickness of around 0.2 mm. As a preference, use is made of finer layers having a surface density less than or equal to 80 g/m$^2$, more preferably this density ranging from 18 g/m$^2$ to 80 g/m$^2$, and a pre-curing thickness less than 0.06 mm. The person skilled in the art will know how to adapt the number of composite layers according to the surface density of these composite layers.

The fibres 15', 15" of each composite layer of laminate contain high-modulus fibres. What is meant in the present description by high modulus is a modulus of extension (Young's modulus) greater than or equal to 55 GPa. According to a preferred alternative form of embodiment of the invention, the high-modulus fibres comprise glass fibres. Preferentially, the glass fibres predominate, which means to say represent more than 50% of the fibres of any one layer. More preferably still, the fibres of each composite layer of laminate are made up of glass fibres. Preferentially, the polymer matrix/fibre ratio by volume in each composite layer of laminate ranges from 35/65 to 70/30, preferably being around 45/55.

According to another preferred alternative form of embodiment of the invention, the high-modulus fibres comprise carbon fibres. Preferentially, the carbon fibres predominate, which means to say represent more than 50% of the fibres of any one layer. More preferably still, the fibres of each composite layer of laminate are made up of carbon fibres. Preferentially, the polymer matrix/fibre ratio by volume in each composite layer of laminate ranges from 35/65 to 60/40, preferably being around 50/50. According to other preferred alternative forms of embodiment of the invention, the high-modulus fibres comprise aramid fibres, basalt fibres or quartz fibres.

The example which follows makes it possible to illustrate the invention; however, the invention cannot be limited to this example.

The crown of a resilient wheel comprises seven layers of strips offset from one another. The strips are made up of a laminate comprising five composite layers coated in a thermosetting polymer matrix made of a polyepoxide resin (composite layers marketed by the company NTPT under the trade name "ThinPreg 402 ™"):

an interior composite layer having mutually-parallel oriented fibres making an angle of 0° with the circumferential direction, and two successive exterior composite layers laid on each side of the interior composite layer, the two layers adjacent to the interior composite layer having mutually-parallel oriented fibres making an angle of −45° with the circumferential direction, and the two outermost layers having mutually-parallel oriented fibres making an angle of +45° with the circumferential direction, each composite layer has a thickness less than than or equal to 80 microns and the strips a thickness less than than or equal to 0.25 mm The strips comprise carbon fibres "T700SC" marketed by the Toray company with a polymer matrix/fibre ratio by volume in each composite layer of 50/50 and a thickness of 0.25 mm. The rubber composition matrix employed here is a high stiffness composition (modulus MA10 equal to around 55 MPa) typically of the type used in the beads (5) of tyres, based on natural rubber, carbon black (approximately 75 phr), reinforcing resin (approximately 20 phr of phenolic resin combined with approximately 8 phr of H3M and HMT), antioxidant, vulcanization system with a high sulfur content (around 5 phr) and the usual vulcanization additives; it also contains around 10 phr of paraffin oil and 8 phr of tackifying resin (butyl-phenol-acetylene resin). Adhesion between the layers of strips and the matrix of rubber composition is ensured by an adhesive of the RFL type which has been applied to the strips in the known way.

A fourth embodiment of the strips 14 is described hereinbelow and illustrated in the same FIG. 11. The reinforcing strips 14 are made up of a laminate of at least 3 composite layers, each composite layer comprising mutually-parallel oriented low-modulus fibres 15, 15', 15" making an angle α with the circumferential direction, coated in a polymer matrix. As a preference, the angle α formed by the fibres with the circumferential direction ranges from −90° to 90°.

In the paragraphs which follow, because the fibres selected are low-modulus fibres rather than high-modulus fibres as in the third embodiment, the differences between the fourth embodiment and the third are particularly drawn to the attention of the reader.

FIG. 11 illustrates an embodiment in which n is equal to 3 and m is equal to 2. According to a preferred variation of embodiment of the invention, n and m are equal to 1. As a greater preference, the angle α of the fibres 15', 15" of the exterior composite layers is equal to 45° or to −45°. According to another preferred variation of embodiment of the invention, n is equal to 1 and m is equal to 2. As a greater preference, the angle α of the fibres 15', 15" of the two exterior juxtaposed layers is equal to 45° or to −45°.

The composite strips may be made from preimpregnated composite layers NTPT ThinPreg 450™ or NTPT ThinPreg 402™ (which can be obtained notably by applying the method described in document WO 2016/198171).

The preimpregnated composite layers are laid raw or unpolymerized at the desired lamination angles and form a width the dimension of which is greater than the width of the strips. The laminated width is cut into raw or unpolymerized strips of the desired width. The raw strips are wound (with an axial offset on each turn) on a large-diameter (i.e. 2 metres diameter) drum. The strips are cured under vacuum (−850 mbar) and under pressure (5 bar) using the usual curing peripherals (such as peel ply, bleeder cloth, microperforated or non-perforated release film, vacuum-bagging film, etc.).

According to another variation of embodiment, the laminated width is laid on a large-diameter drum and cured under vacuum (−850 mbar) and under pressure (5 bar) using the usual curing peripherals After curing, the width is cut into strips. As a preference, the strips have a thickness less than or equal to 1 mm, and more preferably less than or equal to 0.7 mm.

The polymer matrix of each composite layer of laminate of a strip comprises a thermosetting polymer by itself or as a blend with other polymers. Preferentially, the polymer matrix may be selected from among the thermosetting resins of the polyepoxide, unsaturated polyester, vinyl ester, ester cyanate, bismaleimide, type, polyurethanes, and a blend of such resins. Of the aforementioned resins, those that are particularly suitable are thermosetting resins having a glass transition temperature greater than or equal to 160° C. Note that reinforcing fillers (silica, carbon black) or thermoplastic fillers (Orgasol by Arkema) or elastomeric fillers (Kane Ace by Kaneka) may be added to the above thermosetting resins. These composite layers preferably have a surface density of around 200 g/m$^2$ and a pre-curing thickness of around 0.2 mm.

As a preference, use is made of finer layers having a surface density less than or equal to 80 g/m$^2$, more preferably this density ranging from 18 g/m$^2$ to 80 g/m$^2$, and a pre-curing thickness less than 0.06 mm. The person skilled in the art will know how to adapt the number of composite layers according to the surface density of these composite layers.

The fibres of each composite layer of laminate contain low-modulus fibres. What is meant in the present description by low modulus is a modulus of extension (Young's modulus) less than or equal to 30 GPa, preferably ranging from 6 GPa to 30 GPa.

According to a preferred variation of embodiment of the invention, the low-modulus fibres of each composite layer of laminate comprise polyethylene terephthalate fibres. Preferentially, the polyethylene terephthalate fibres predominate, which means to say represent more than 50% of the fibres of any one layer. More preferably still, the fibres of each composite layer of laminate are made up of polyethylene terephthalate fibres. According to other preferred variations of embodiment of the invention, the fibres of each composite layer of laminate comprise polyamide fibres (such as semi-aromatic PA66, PA46, PA6, PA10), cellulose or rayon fibres, or UHMWPE polyethylene fibres such as Dyneema fibre or else low-modulus thermoplastic fibres.

Each of these types of fibre can be used preferably as predominant content, namely representing more than 50% of the fibres in any one layer, and more preferably still each of these types of fibre constituting all of the fibres in each composite layer of laminate. According to a preferred variation of the invention, the polymer matrix/fibre ratio by volume in each composite layer of laminate ranges from 25/75 to 55/45, preferably being around 45/55.

The invention claimed is:

1. A non-pneumatic wheel comprising an annular reinforcing structure produced from at least one elastomer compound, arranged radially on the inside of a tread, the annular reinforcing structure comprising a plurality of reinforcing strips arranged in layers, the reinforcing strips of each of the layers being arranged in an axial juxtaposition and being oriented in a substantially circumferential direction, and the reinforcing strips being coated with an elastomer composition, wherein the annular reinforcing structure comprises N radially superposed layers of reinforcing strips, N being greater than or equal to three, wherein a virtual axis C-C substantially perpendicular to the reinforcing strips intersects at least N−1 reinforcing strips in any axial position of the virtual axis in the annular reinforcing structure, wherein each layer of reinforcing strips is embedded in a matrix of rubber composition which, when cross-linked, has a secant tensile modulus at 10% elongation greater than or equal to 10 MPa, and wherein the reinforcing strips are made of a laminate of at least three composite layers, each composite layer comprising mutually-parallel oriented high-modulus fibers making an angle α with the circumferential direction, coated in a polymer matrix.

2. The non-pneumatic wheel according to claim 1, wherein the reinforcing strips are arranged in four layers, the reinforcing strips of each layer overlapping the reinforcing strips of the layer that is radially inside of it by at least 20% and at most 80%.

3. The non-pneumatic wheel according to claim 1, wherein, for each composite layer of the laminate, the angle α formed by the fibers with the circumferential direction ranges from −90° to 90°.

4. The non-pneumatic wheel according to claim 1, wherein the laminate comprises:

n interior composite layers having fibers of which the angle with the circumferential direction is 0°, n being a number greater than or equal to 1, the n interior composite layers being juxtaposed with one another and flanked on each side respectively by m exterior composite layers; and m exterior composite layers having fibers forming an angle α other than 0° with the circumferential direction, m ranging from 1 to 8, the angle α of the fibers of successive exterior composite layers laid on one same side of the interior composite layers being identical or different, and the angle α of the fibers of two exterior composite layers laid symmetrically one on each side of interior composite layers being identical, such that the total of composite layers is equal to at least the at least three composite layers.

5. The non-pneumatic wheel according to claim 1, wherein the laminate comprises:

n interior composite layers having fibers of which the angle with the circumferential direction is 0°, n being a number greater than or equal to 3, the n interior composite layers being juxtaposed with one another and flanked on each side respectively by m exterior composite layers; and m exterior composite layers having fibers forming an angle α other than 0° with the circumferential direction, m ranging from 1 to 8, the angle α of the fibers of successive exterior composite layers laid on one same side of the interior composite layers being identical or different, and the angle α of the fibers of two exterior composite layers laid symmetrically one on each side of the interior composite layers being identical in terms of absolute value, but having opposite sign.

6. A non-pneumatic wheel comprising an annular reinforcing structure produced from at least one elastomer compound, arranged radially on the inside of a tread, the annular reinforcing structure comprising a plurality of reinforcing strips arranged in layers, the reinforcing strips of each of the layers being arranged in an axial juxtaposition and being oriented in a substantially circumferential direction, and the reinforcing strips being coated with an elastomer composition, wherein the annular reinforcing structure comprises N radially superposed layers of reinforcing strips, N being greater than or equal to three, wherein a virtual axis C-C substantially perpendicular to the reinforcing strips intersects at least N−1 reinforcing strips in any axial position of the virtual axis in the annular reinforcing structure, wherein each layer of reinforcing strips is embedded in a matrix of rubber composition which, when cross-linked, has a secant tensile modulus at 10% elongation greater than or equal to 10 MPa, and wherein the reinforcing strips are made of a laminate of at least three composite layers, each composite layer comprising mutually-parallel oriented low-modulus fibers making an angle α with the circumferential direction, coated in a polymer matrix.

7. The non-pneumatic wheel according to claim 4, wherein the number n ranges from 1 to 12.

8. The non-pneumatic wheel according to claim 4, wherein the angle α of the fibers of the exterior composite layers is equal to 45° or to −45°.

9. The non-pneumatic wheel according to claim 4, wherein n is equal to 1 and m is equal to 2.

10. The non-pneumatic wheel according to claim 5, wherein the number n ranges from 3 to 12.

11. The non-pneumatic wheel according to claim 1, wherein a length to width ratio and width to thickness ratio of the reinforcing strips is greater than or equal to 5.

12. The non-pneumatic wheel according to claim 6, wherein a length to width ratio and width to thickness ratio of the reinforcing strips is greater than or equal to 5.

* * * * *